July 25, 1933.  B. THULIN  1,919,488

INTERNAL COMBUSTION ENGINE

Filed April 11, 1930

SECTION : A-A.

SECTION : B-B

SECTION : C-C.

Bjarne Thulin.

INVENTOR

Patented July 25, 1933

1,919,488

UNITED STATES PATENT OFFICE

BJARNE THULIN, OF DETROIT, MICHIGAN

INTERNAL COMBUSTION ENGINE

Application filed April 11, 1930. Serial No. 443,494.

This invention relates to reciprocating internal combustion engines and has for its object to provide a combustion chamber with many distinct advantages.

One advantage is that extremely favorable conditions are obtained for rapid and complete combustion of the fuel, because intense turbulence is induced in a manner systematically adapted to the fuel spray. Another advantage is that the combustion chamber fits perfectly to the shape of a single fuel spray and consequently is especially adaptable to engines of small cylinder size. A third advantage is that this combustion chamber permits the use of very large valves in the cylinder head, which facilitates engine operation at high speed. It will be seen from the above that my engine is preeminently suited for automotive or aeronautic use. A fourth advantage is that my combustion chamber, if desired, may be successfully applied to fuel injection engines with low compression ratio and electric ignition system, because sufficient localization is obtainable for the fuel charge in part of the combustion air to insure spark-ignition at reduced engine loads. Several other vital advantages of my invention will appear from the following specification.

One modification of a combustion chamber according to my invention is shown in the accompanying drawing, in which:—

Figure 1:
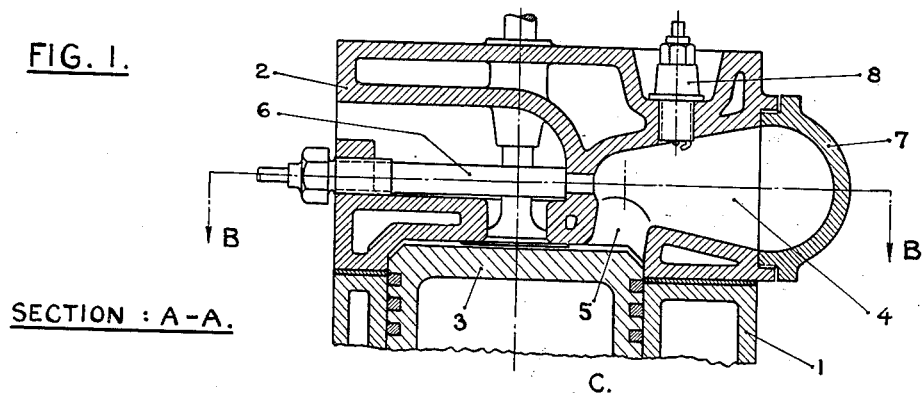
Figure 2:
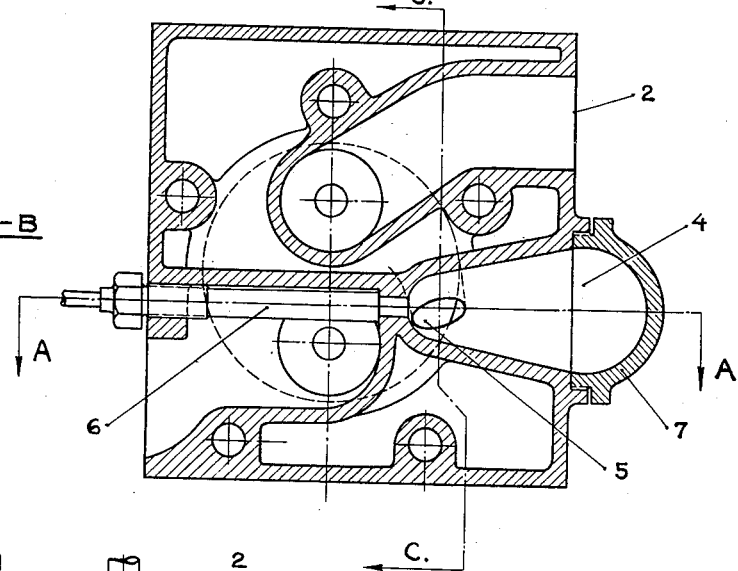
Figure 3:
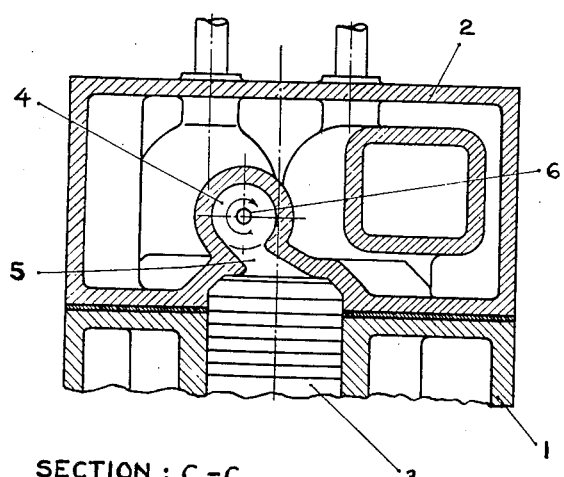

Figure 1 is a vertical section through the engine piston, cylinder and cylinder head with the combustion chamber; this section is taken on the line "A—A" in Figure 2. Figure 2 is a horizontal section through cylinder head with the combustion chamber, taken on the line "B—B" in Figure 1. Figure 3 is a vertical section through engine cylinder and head, taken on the line "C—C" in Figure 2.

Similar numerals refer to similar parts throughout the several views.

Referring to Figure 1, which is a vertical section through the upper part of the engine taken at the centerline of the combustion chamber, (1) is the engine cylinder and (2) the cylinder head. The smallest practical clearance is left between the inner face of the cylinder head (2) and the top of the piston (3) at top dead center position. The major part of the combustion air charge is, therefore, displaced over into the combustion chamber (4) and the throat (5) at the end of the compression stroke. The combustion chamber (4) itself is preferably a body of revolution and may be of cylindrical or similar shape. The pearshaped form shown on the figure has the advantage to fit particularly well to a fuel spray injected through the single-holed fuel nozzle (6) shown on the figure. Water cooling or chemical cooling may be provided for the detachable end cover (7) of the combustion chamber (4), if desired. It is well established oil engine experience that a free space for development of the fuel spray is essential to clean exhaust, and the ideal arrangement of my invention in this respect is a feature of paramount importance in automotive oil engines, where the clearance volume per cylinder is very small.

The fuel mixture in the combustion chamber shown is richest near the throat, where new fuel particles are continuously supplied by the spray during the entire injection period. Ignition starts near the tip of the spray and the jet burns backwards against the nozzle orifice. For these reasons no unburned fuel or unused air is left in the combustion chamber at the end of the power stroke of the engine piston, the process occurring as follows: At ignition near the spray tip the gaseous combustion products generated at this point expand due to the local temperature increase. This reverses the air flow in the combustion chamber and the spray cloud nearer to the nozzle is eventually blown out into the cylinder and intimately mixed with combustion air in the combustion chamber, throat and cylinder. This insures rapid and complete combustion. No foul air is trapped near the fuel nozzle orifice where it may interfere with rapid combustion of afterdrippings from the fuel nozzle or the adjacent portion of the fuel spray injected during the next power stroke. The nozzle location, fairly near to the relatively restricted throat passage (5), insures efficient removal of even a poor fuel spray from its point of issue. In these respects my invention shows advantages over most existing designs involving the subdivided combustion chamber type.

It is customary to refer to fuel injection engines of this type, where the combustion air flows back against the direction of the injected fuel spray subsequent to ignition, as back-flow engines. The distinction between back-flow and through-flow engines is not always sharp, but it is logical and sufficient for definition purposes in this patent to consider, that a back-flow type is indicated if the location of the throat opening with respect to the combustion chamber is such, that at least half of the air volume in the combustion chamber must flow against the direction of the fuel spray in order to get out in the engine cylinder.

A further advantage of my combustion chamber is that detonation (engine knock) should be effectively counteracted, due to the type of volume distribution utilized in combination with the systematically organized air flow hereinafter described. I induce rotation of the air in the combustion chamber around the axis B—B by giving the throat (5) a tangential direction relative to the combustion chamber (4) as shown on Figure 3. By this centrifugal effect, a better fuel mixture is obtained in the combustion chamber even with low fuel injection pressure, and an unpractically small nozzle orifice is unnecessary even for engines of small cylinder size. Furthermore, a better stratification between fuel mixture and combustion gases in the chamber is insured, so that my invention can be successively applied over an unusually wide range of compression ratios (from 5:1 to 18:1). If low compression ratios are used, a spark plug or an electric filament (8) is employed as a means to ignite the spray cloud, the electric ignition being effected when some part of the spray cloud passes the electrodes or the hot filament. If higher compression ratios are used, the spark plug (8) may be entirely dispensed with, or it may be used to facilitate ignition when the engine is cold. Cold-starting may eventually also be facilitated by other conventional means (glow paper, externally heated surfaces, etc.).

The combustion chamber shape and throat passage arrangement according to my invention brings about a much better mixture of fuel and air in the engine than does any arrangement previously known. During compression, air is compelled to enter the combustion chamber near the emission point of the fuel spray and flows further in a helical path around the spray axis into the combustion chamber, the progress of the helix being in the direction of the fuel travel. The superiority of similar carburetion schemes is fully established by experience with oil burners as used in steam boilers, but a practical adaption of any such systematic method to the carburetion in fuel injection engines seems to be entirely new. It represents an important achievement of my invention.

Figure 2 is a horizontal section through the cylinder head, taken in a plane through the combustion chamber axis (line B—B in Figure 1). It will be seen that the throat passage (5) between the combustion chamber (4) and the clearance volume in the cylinder joins into the cylinder in a tangential direction as indicated by the dotted lines, so that a gas flow to the cylinder during the combustion period will tend to induce rotation of the air in the cylinder and thereby feed fresh air past the throat. This insures rapid and complete utilization of every bit of air in the clearance volume.

The fuel injection valve housing (6), as shown, is located in the air passage to the inlet valve and is thereby cooled by cold incoming air. This cooling helps to keep the temperature of the injection valve uniform and moderate, preventing carbon-formation at the nozzle orifice and faulty spray formation caused by overheating of this part. Furthermore, this injection valve arrangement greatly facilitates and simplifies the design of such multicylinder engines according to my invention, which have both exhaust and air intake valve located in the cylinder head.

Figure 3 shows a vertical section through the upper part of the engine, taken on the line C—C in Figure 2. This figure shows the inclined direction of the throat (5) which induces the rotation of the air in the combustion chamber (4), the rotation being in the direction of the circular arrow shown for gas flow through the throat towards the combustion chamber. The fact that the throat passage joins the cylinder at an oblique angle, as well as the induced rotation of the air in the cylinder, prevents sharp flame impingement on the piston top and local overheating due to any such cause. This is one of the numerous advantages of my design.

My invention is not limited to the particular design shown in the drawing attached, but can be considerably modified without a departure from the ideas described and shown. It can be adapted for both two- and four-stroke engines with none, one, or several valves in the cylinder head. I prefer to use one single throat passage between the engine cylinder and combustion chamber, mainly for the sake of simplicity and durability; but also because several smaller throat holes will tend to chill the flame and cause detonation. However, if more than one throat hole is used, the special action and advantages of my device can be maintained only if at least one of them joins the combustion chamber near the fuel spray emission point.

I claim:

1. In an internal combustion engine, having piston, cylinder, and cylinder head, a substantially pear-shaped combustion chamber, means for injecting fuel only, as a spray from a point on the wall of the said combustion chamber, said spray originating from the small end of the said combustion chamber and pointing substantially in the direction of its axis; and a throat passage leading from the small end of said combustion chamber to the said engine cylinder.

2. An apparatus for carbureting with fuel spray the air in an internal combustion engine of the direct fuel injection type; comprising a combustion chamber shaped substantially as a body of revolution around a reference axis, means for injecting fuel only, during the compression stroke of the engine piston, into the said combustion chamber and substantially in the direction of its said reference axis; and means for feeding the air, when compressed by the said piston, to the fuel spray near its point of emission, said air feeding means entering the said combustion chamber tangentially, whereby the air so fed is caused to rotate around the said reference axis of said combustion chamber.

3. In an internal combustion engine, having piston, cylinder, and cylinder head, an elongated combustion chamber, a fuel nozzle for injecting a fuel spray from one end of the said combustion chamber and substantially in the direction of its longitudinal axis, means forming direct communication between the said engine cylinder and the said combustion chamber, said communicating means joining the cylinder as well as the combustion chamber at oblique angles and opening tangentially both into said cylinder and said combustion chamber, and furthermore, said communicating means entering the said combustion chamber at such a point, that less than half of the air volume in said combustion chamber lies between said communicating means and said fuel nozzle.

4. In an internal combustion engine, an elongated combustion chamber, means for injecting fuel only, as a spray from one end of said combustion chamber and substantially in the direction of its longitudinal axis, and means to initiate rotation of the air, displaced from the cylinder into the said combustion chamber during compression, around the axis of the said fuel spray from that end of the said combustion chamber, where the said fuel spray issues.

5. In an internal combustion engine, having piston, cylinder, and cylinder head, an elongated combustion chamber, a fuel spray nozzle at one end of the said combustion chamber, said nozzle being adapted to inject a fuel spray substantially along the longitudinal axis of said chamber, and said chamber increasing in cross-sectional size away from said nozzle so as to fit approximately to the shape of the injected fuel spray; a restricted throat passage forming a direct connection between the said engine cylinder and that end of the said combustion chamber from where the said fuel spray issues, said throat passage entering the said cylinder tangentially whereby air forced from said combustion chamber through said passage is caused to rotate around the cylinder axis.

6. In an internal combustion engine having piston, cylinder and cylinder head, an elongated combustion chamber, a fuel spray nozzle at one end of the said combustion chamber, said nozzle being adapted to spray fuel substantially along the longitudinal axis of the said chamber, and said chamber increasing in cross-sectional size away from said nozzle so as to fit approximately to the shape of the injected fuel spray; a restricted throat passage forming a direct connection between the said engine cylinder and that end of the said combustion chamber from where the said fuel spray issues, said throat passage joining the cylinder as well as the combustion chamber at oblique angles, the centerline of the throat having tangential components as well in a plane perpendicular to the cylinder axis as in a plane perpendicular to the longitudinal axis of the said combustion chamber.

7. In an internal combustion engine, having piston, cylinder, and cylinder head, a substantially pear-shaped combustion chamber, means for injecting fuel only, as a spray from a point on the wall of said combustion chamber, said spray originating from the small end of the said combustion chamber and pointing substantially in the direction of its axis; and a throat passage leading from the small end of said combustion chamber to the said engine cylinder, the rectilinear extension of the centerline of said throat passage having no intersection with the rectilinear extension of the said combustion chamber axis.

8. In an internal combustion engine, having piston, cylinder, and cylinder head, and elongated combustion chamber shaped substantially as a body of revolution around the longitudinal axis, means for injecting fuel only from one end of the said combustion chamber and substantially in the direction of its said longitudinal axis; and a throat passage leading to the said engine cylinder from that end of the said combustion chamber, where the said fuel stream issues; the rectilinear extension of the centerline of said throat passage having no intersection with the rectilinear extension of said combustion chamber axis, and furthermore, the centerline of said throat passage having such a direction, so that a plane, laid through the said centerline and the perpendicular intersection line between said centerline and said combustion chamber axis, forms an acute angle with the positive direction of the fuel stream.

9. In an internal combustion engine, having piston, cylinder, and cylinder head, and air inlet and gas outlet passages for said cylinder, an elongated combustion chamber, a fuel injection valve housing exposed to the suction air in the said inlet passage, said injection valve housing carrying a nozzle adapted to emit fuel only, as a spray from one end of the said combustion chamber itself, towards the center of it and substantially in the direction of its longitudinal axis, and a restricted throat passage forming a direct connection between the said engine cylinder and that end of the said combustion chamber where the said fuel spray issues.

BJARNE THULIN.